UNITED STATES PATENT OFFICE.

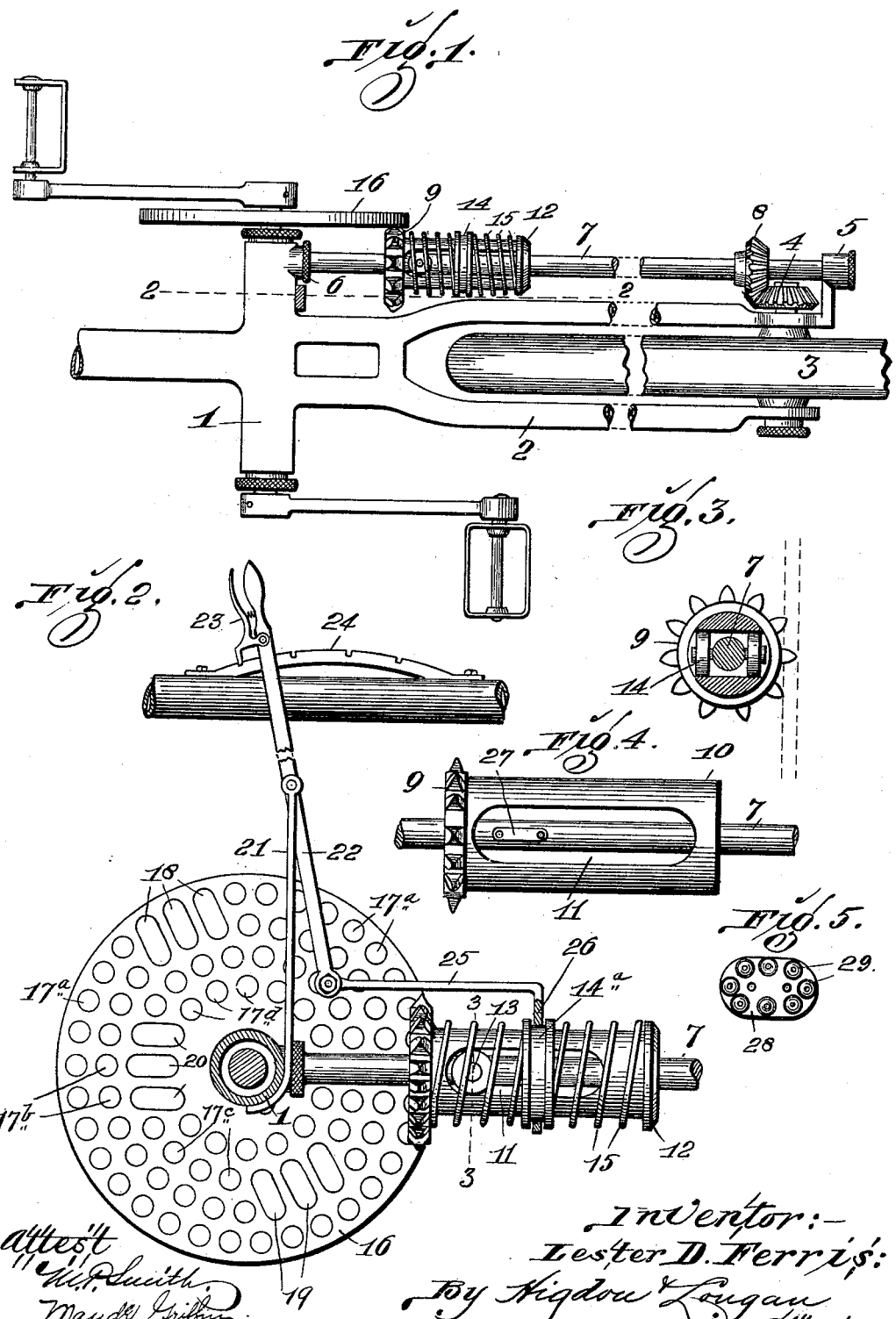

LESTER D. FERRIS, OF HOOD RIVER, OREGON.

CHANGEABLE-SPEED GEARING.

SPECIFICATION forming part of Letters Patent No. 619,551, dated February 14, 1899.

Application filed November 7, 1898. Serial No. 695,772. (No model.)

*To all whom it may concern:*

Be it known that I, LESTER D. FERRIS, of the city of Hood River, Wasco county, State of Oregon, have invented certain new and useful Improvements in Changeable-Speed Gearing, of which the following is a full, clear, and exact description, reference being had to the accompanying drawings, forming a part thereof.

My invention relates to changeable-speed gearing; and it consists of the novel construction, combination, and arrangement of parts hereinafter shown, described, and claimed.

Figure 1 is a plan view of my improved changeable-speed gearing, the same being applied to a bicycle. Fig. 2 is an enlarged detail sectional view taken approximately on the line 2 2 of Fig. 1 and showing the operating-lever in position relative to the changeable-speed gearing. Fig. 3 is a vertical sectional view taken approximately on the line 3 3 of Fig. 2. Fig. 4 is a side elevation of a modified form of the sleeve made use of in carrying out my invention. Fig. 5 is an elevation of the inside of a ball-bearing plate used in connection with this modified form of the sleeve.

Referring by numerals to the accompanying drawings, 1 indicates the bearing for the crank-axle of a bicycle, which bearing is formed in the bicycle-frame, and extending rearwardly therefrom is the rear lower fork 2 of said bicycle-frame, in which fork is journaled in the usual manner the rear wheel 3. Rigidly fixed upon one end of the axle of the rear wheel is a beveled pinion 4, and formed at the rear end of one of the arms of the fork 2 is a bearing 5, there being a bearing 6 formed upon the rear side of the bearing 1 and said bearing 6 being in alinement with said bearing 5. Arranged for rotation in these alined bearings 5 and 6 is a shaft 7, upon which is rigidly fixed a beveled pinion 8, that meshes with the pinion 4. Arranged to slide upon the forward end of the shaft 7 is a toothed wheel 9, and formed integral with and extending rearwardly from said wheel is a sleeve 10, which is provided with longitudinally-extending oppositely-arranged slots 11, and upon the rear end of said sleeve is formed a flange 12. Passing diametrically through the shaft 7 is a pin 13, and upon the ends thereof, on each side of said shaft 7, are antifriction-rollers 14, the same operating in the slots 11. Arranged to slide upon the sleeve 10 is a grooved collar $14^a$, and interposed between said collar and the toothed wheel 9 and the flange 12 are the expansive coil-springs 15.

Rigidly fixed upon the crank-shaft that rotates in the bearing 1 is a disk 16, the same being provided with a plurality of concentric rows of apertures $17^a$, $17^b$, $17^c$, and $17^d$, the same being uniform in size and arranged at equal distances apart. A plurality of the outer row of apertures $17^a$ are joined with an equal number of coinciding apertures in the second row $17^b$, thus forming the slots 18, the same being parallel with each other and the center one of said slots being in alinement with the center of the disk 16. Certain of the apertures $17^b$ are joined with the adjacent apertures of the next row $17^c$, thus forming the slots 19, and certain of the apertures of the row $17^c$ are joined with the adjacent apertures of the inner row $17^d$, thus forming the slots 20.

Fixed to and extending upwardly from the bearing 1 is an arm 21, to the upper end of which is fulcrumed a hand-lever 22, the upper end thereof being provided with a spring-actuated latch 23, the point of which engages in notches formed in a segmental rack 24, that is carried by the horizontal bar of the bicycle-frame immediately in front of the seat. To the lower end of the lever 22 is pivotally connected the forward end of a horizontally-arranged rod 25, the same extending rearwardly to a point immediately above the grooved collar $14^a$ and there being joined to a ring 26, that encircles said grooved collar.

In the modification shown in Figs. 4 and 5 antifriction-rollers 14 are dispensed with and elongated lugs 27 are formed on the opposite sides of the shaft 7, and plates 28 are seated upon said oppositely-arranged lugs, upon the inner sides of which plates 28 are rotatably arranged balls 29, thus forming a ball-bearing for the sleeve 10.

When my improved changeable-speed gearing is in operation and the shaft carrying the disk 16 is rotated, the teeth of the wheel 9 will engage in one of the rows of apertures in said disk 16 and said toothed wheel and the sleeve will be rotated and the rotary motion will be imparted to the shaft 7 and pinion 8 thereon and in turn the rear wheel 3 of the bicycle will be driven, for the reason that the pinion 4, carried by the axle of said rear bicycle-wheel, meshes with the pinion 8. When the toothed wheel 9 is meshing in the outer row of apertures 17ª, the greatest speed is obtained, for the reason that said outer row of apertures is formed on a circle much larger than the inner rows, and at one rotation of the disk 16 the toothed wheel 9 and shaft 7 will be rotated a greater number of times than if said toothed wheel was meshing in one of the inner rows of apertures. Should said toothed wheel be meshing in the outer row 17ª and it be desired to reduce the speed while running, the operator disengages the point of the latch 23 from the notch in which it has been seated and pulls the upper end of the hand-lever rearwardly until the point of said latch engages in the second one of the notches in the segmental rack 24. This moves the rod 25 and ring 26, carried thereby, forwardly, and in so doing the grooved collar 14ª is moved toward the toothed wheel 9 and the coil-spring 15, interposed between said grooved collar and the toothed wheel, is compressed. When in the continued rotation of the disk 16 the outer ends of the slots 18 are brought into a position to be engaged by the teeth of the wheel 9, the power stored in the compressed coil-spring will throw the toothed wheel and sleeve forwardly a slight distance or until the teeth that are engaging in said slots 18 reach the lower ends of said slots, and with the continued rotation of the disk 16 the teeth of the wheel 9 will engage in the second row of apertures 17ᵇ. As this second row of apertures 17ᵇ is formed on a circle smaller than the outer row of apertures 17ª, the toothed wheel 9 and shaft 7 will not be rotated as many times as when said toothed wheel was traveling in the outer row of apertures 17ª. Consequently the speed of said toothed wheel and the shaft 7 will be reduced. This action and operation may be repeated until the inner row of apertures 17ᵈ is reached, and at this point the shaft 7 will be driven at a very low speed, but with great power, for the reason that the inner row of apertures 17ª is very near the center of the disk 16.

The toothed wheel 9 may be caused to move from one row of apertures to the other while running, it being only necessary to move the latch 23 of the hand-lever one notch to move the toothed wheel from one row of apertures to the next adjacent row.

A changeable-speed gearing of my improved construction may be advantageously used in a various number of machines, though it is particularly adapted for bicycles and the like for the reason that a "high gear" may be instantly obtained where the rider desires to use speed upon a level roadway or the like; or, if desired, a low gear may be instantly obtained when the rider desires to ascend an incline.

My improved gearing is simple, inexpensive, may be instantly transformed while the device is running, and does away with the chain-gearing now in common use upon bicycles.

I claim—

1. In a device of the class described, a driven shaft, a disk rigidly fixed thereon, in which disk is formed a plurality of concentric rows of apertures, each row being connected to the next adjacent row by a plurality of parallel slots, a counter-shaft rotatably arranged, a sleeve arranged to slide upon said counter-shaft, and a toothed wheel integral with said sleeve, which toothed wheel meshes in the apertures of the disk, substantially as specified.

2. In a device of the class described, a driven shaft, a disk rigidly fixed thereon, in which disk is formed a plurality of concentric rows of apertures, each row being connected to the next adjacent row by a plurality of parallel slots, a rotatably-arranged counter-shaft, a sleeve arranged to slide upon said counter-shaft, a toothed wheel integral with said sleeve, which toothed wheel meshes in the apertures of the disk, and means for moving the sleeve upon the counter-shaft, substantially as specified.

3. In a device of the class described, a driven shaft, a disk rigidly fixed thereon, in which disk is formed a plurality of concentric rows of apertures, each row being connected to the next adjacent row by a plurality of parallel slots, a counter-shaft rotatably arranged, a sleeve arranged to slide upon said counter-shaft, a toothed wheel integral with said sleeve, which toothed wheel meshes in the apertures of the disk, a grooved collar arranged to slide upon the sleeve, expansive coil-springs arranged upon said sleeve on each side of said collar, and means whereby said collar is moved upon said sleeve, substantially as specified.

4. In a changeable-speed gearing, a driven shaft, a disk rigidly located thereon, in which disk is formed a plurality of concentric rows of apertures, which apertures are of uniform size and arranged at equal distances apart, each of said rows of apertures being connected to the next adjacent row by means of a plurality of parallel slots, a counter-shaft rotatably arranged, a toothed wheel arranged to slide upon said counter-shaft, which toothed wheel meshes in the apertures of the disk, and means for moving said toothed wheel longitudinally upon the counter-shaft, substantially as specified.

In testimony whereof I affix my signature in presence of two witnesses.

LESTER D. FERRIS.

Witnesses:
H. S. FERRIS,
GEO. P. CROWELL.